April 19, 1960   L. J. C. CONNELL   2,933,663
SEMI-CONDUCTOR DEVICES

Filed March 29, 1956

INVENTOR
LESLIE JAMES CAMBRIDGE CONNELL

BY

ATTORNEY

April 19, 1960 L. J. C. CONNELL 2,933,663
SEMI-CONDUCTOR DEVICES
Filed March 29, 1956 2 Sheets-Sheet 2

INVENTOR
LESLIE JAMES CAMBRIDGE CONNELL
BY
ATTORNEY

United States Patent Office 2,933,663
Patented Apr. 19, 1960

2,933,663
SEMI-CONDUCTOR DEVICES

Leslie James Cambridge Connell, Harrow Weald, England, assignor to The General Electric Company Limited, London, England Application March 29, 1956, Serial No. 574,766

Claims priority, application Great Britain April 1, 1955

4 Claims. (Cl. 317—234)

This invention relates to semi-conductor devices and particularly to semi-conductor rectifier devices of the junction type.

An object of the present invention is the provision of a rectifier of this type which is adapted for use in power rectifiers.

According to the present invention, in a semi-conductor rectifier device of the junction type including a rectifying element, the element is clamped between a pair of opposing electrodes serving as current leads, and the electrodes are clamped together in an insulating manner by clamping means disposed radially outwards of the rectifying element.

One or both electrodes, besides serving as current leads, may act as part of cooling means for the rectifying element.

The electrodes may consist of cylindrical copper blocks to one of which the rectifying element is soldered or bonded, and radially projecting flanges may be secured to each block, the opposing flanges being clamped together under spring pressure.

In order that the invention may be clearly understood, a construction of semi-conductor power rectifier in accordance with the present invention, will now be described by way of example with reference to the accompanying drawings which are somewhat diagrammatic, and in which.

Figure 1:
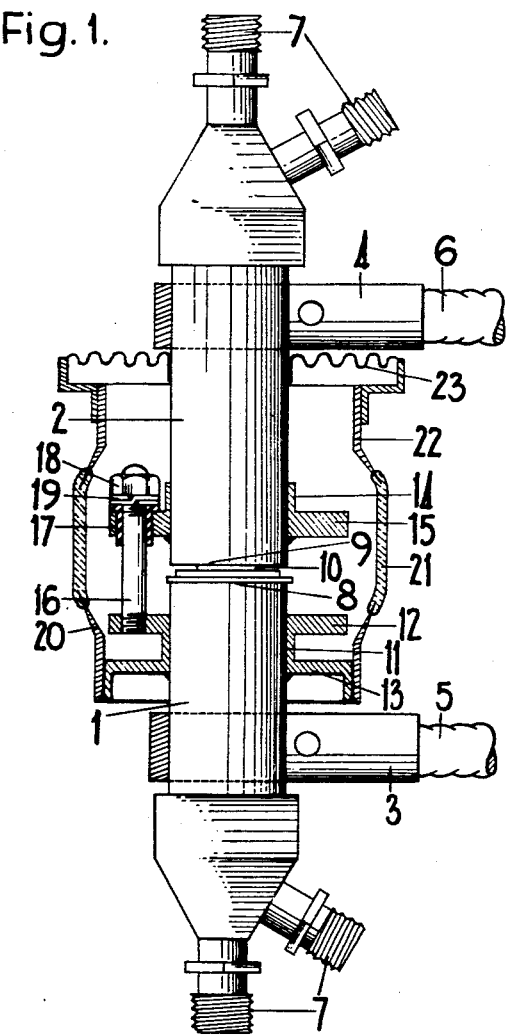
Figure 1 is a side elevation, partly in section, of the rectifier.

Referring now to Figure 1, the rectifier shown comprises a pair of opposing electrodes in the form of hollow cylindrical copper blocks 1 and 2, each block having attached to it by a clamp 3 or 4, a flexible current lead 5 or 6. Provision by way of pipes 7 and suitable internal block partitions, is made for cooling the circular closed ends 8 and 9 of the blocks 1 or 2 by flow of water and the rectifying element, generally indicated by the reference numeral 10, is disposed between the two blocks, being soldered to the block 1. Preferably, the actual rectifying element is made by the method described hereinafter, the rectifying element being of the p–n junction type including germanium and indium, and the block 2, having on its lower end an indium bead with a machined surface engaging a machined surface of indium of the rectifying element, is attached to the copper block 1.

Attached as by hard soldering to the block 1 is an annular copper member 11 which provides an upper radial flange 12 and a lower radial flange 13. Similarly attached to the block 2 is an annular copper member 14 providing a single radial flange 15 and the two flanges 12 and 15 are used for clamping the two copper blocks 1 and 2 together with the rectifying element 10 between them. Spaced 120° apart around the axis of the rectifier are three clamping bolts only one 16 of which is shown and each of these bolts is hard soldered into the flange 12, passes through an insulating sleeve 17 set in the flange 15 and carries a clamping nut 18 and a spring washer 19, the three bolts effectively clamping the rectifying element in place.

In order to enclose the rectifying element, a case comprising a glass cylinder 21, to which are bonded annular copper end members 20 and 22, is soft soldered at one end to the flange 13, and at the other to an annular copper member which is brazed to an annular flexible diaphragm 23 and connected by way of the diaphragm 23 to the block 2. The glass cylinder is provided with a pumping tube (not shown) for evacuating the enclosure and filling it with an inert atmosphere. It will be appreciated, of course, that it is necessary first to assemble the rectifying element 10 between the copper blocks 1 and 2 and to clamp it in place before making the final enclosure. In order to prevent overheating of the rectifying element during the soldering operations, these operations are carried out by eddy current heating and the copper blocks are at the same time cooled internally.

Figure 2:
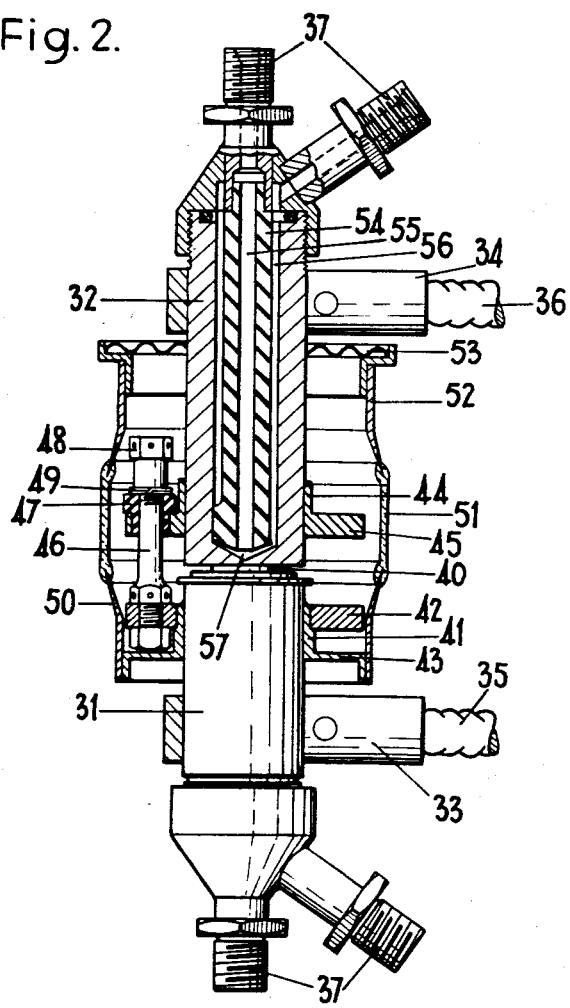
Figure 2 is a side elevation, partly in section, of the rectifier in a slightly modified form.

Referring now to Figure 2, a rectifier of essentially the same construction as that shown in Figure 1, comprises a pair of opposing electrodes in the form of hollow cylindrical copper blocks 31 and 32, each block having attached to it a suitable current lead. A rectifying element generally indicated by the reference number 40 is disposed between the two blocks, being soldered to the block 31. Disposed within each of the blocks 31 and 32 is an internal block partition 54, being shown in section in the block 32. These block partitions each have a central longitudinal passage 55 the end of which is closely spaced from the inner surface of the end 57 of the block adjacent to the rectifying element 40, and each block partition is spaced from the sides of the block to provide an annular passage 56. The arrangement is such that, in operation, water passes down the central passage 55 towards the end 57 of each block, and back through the annular passage 56. Provision by way of pipes 37 is made for the flow of water to and from the insides of the blocks.

Attached as by hard soldering to the block 31 is an annular copper member 41 having a lower radial flange 43, and a further member 42 of stainless steel is brazed to the member 41 to provide an upper radial flange. Similarly attached to block 32 is an annular stainless steel member 44 providing a radial flange 45 and the two flanges 42 and 45 are used for clamping the two copper blocks 31 and 32 together with the rectifier element 40 between them. Spaced 120° apart around the axis of the rectifier are three clamping bolts only one 46 of which is shown, and each of these bolts is screwed into the flange 42, passes through an insulating sleeve 47 set in the flange 45 and carries a clamping nut 48 and a spring washer 49, the three bolts effectively clamping the rectifying element in place.

The rectifying element is enclosed in the same manner as in the preceding example.

It will be appreciated from the above description that the clamping arrangement in accordance with the invention enables a compact and convenient form of rectifier to be made and the clamping arrangement does not in any way dictate the particular method by which the junction should be formed.

Preferably, however, the rectifying element is formed by evaporating or otherwise applying a layer of gold to one surface of a slice of germanium over a restricted portion of its area, placing upon this restricted portion such a quantity of indium that, when fused, it substantially covers but does not extend beyond the restricted portion, and subjecting the germanium and indium to heat treatment to cause formation of the junction, and to form on the surface of the slice a bead mainly consisting of the indium.

I claim:

1. A semiconductor rectifier device of the junction type comprising a pair of opposing electrodes of cylindrical form, a rectifying element bonded to one of said electrodes, a radially projecting flange secured to each of said electrodes, means for clamping said radially projecting flanges together under spring pressure, a first annular member secured to one of said electrodes, a second annular member disposed around the other electrode and attached thereto by way of an annular flexible diaphragm, and a glass cylinder sealed at its ends to said annular members, said rectifying element being clamped between said electrodes and enclosed in an air-tight manner by the assembly consisting of said glass cylinder, annular members, and annular flexible diaphragm.

2. A semiconductor rectifier device of the junction type comprising a first electrode of hollow cylindrical form, a second electrode opposing said first electrode, a rectifying element clamped between said electrodes, clamping means disposed radially outwards of said rectifying element for clamping said electrodes together in an insulating manner, and an internal block partition disposed within said first electrode providing passages for cooling fluid for cooling said rectifying element.

3. A semiconductor rectifier device of the junction type comprising a pair of opposing electrodes of cylindrical form, a rectifying element bonded to one of said electrodes, cooling means for said rectifying element disposed within at least one of said electrodes, a radially projecting flange screwed to each of said electrodes, means for clamping said radially projecting flanges together under spring pressure, a first annular member secured to one of said electrodes, a second annular member disposed around the other electrode and attached thereto by way of an annular flexible diaphragm, and a glass cylinder sealed at its ends to said annular members, said rectifying element being clamped between said electrodes and enclosed in an air-tight manner by the assembly consisting of said glass cylinder, annular members, and annular flexible diaphragm.

4. A semiconductor rectifier device of the junction type comprising a first electrode of hollow cylindrical form, a second electrode opposing said first electrode, a rectifying element bonded to one of said electrodes, an internal block partition disposed within said first electrode and providing passages for cooling fluid for cooling said rectifying element, a radially projecting flange screwed to each of said electrodes, means for clamping said radially projecting flanges together under spring pressure, a first annular member secured to one of said electrodes, a second annular member disposed around the other electrode and attached thereto by way of an annular flexible diaphragm, and a glass cylinder sealed at its ends to said annular members, said rectifying element being clamped between said electrodes and enclosed in an air-tight manner by the assembly consisting of said glass cylinder, annular members, and annular flexible diaphragm.

References Cited in the file of this patent

UNITED STATES PATENTS

| | | |
|---|---|---|
| 1,751,360 | Ruben | Mar. 18, 1930 |
| 1,809,925 | Edwards | June 16, 1931 |
| 1,872,304 | Kraut et al. | Aug. 16, 1932 |
| 2,718,615 | Riley | Sept. 20, 1955 |
| 2,725,505 | Webster et al. | Nov. 29, 1955 |
| 2,776,920 | Dunlap | Jan. 8, 1957 |
| 2,780,759 | Boyer et al. | Feb. 5, 1957 |